United States Patent [19]

Cosper et al.

[11] Patent Number: 4,523,932

[45] Date of Patent: * Jun. 18, 1985

[54] HYDROTROPES AND USES THEREOF

[75] Inventors: David R. Cosper, Downers Grove; Gretchen L. McKay, Addison, both of Ill.

[73] Assignee: Nalco Chemical Company, Oak Brook, Ill.

[*] Notice: The portion of the term of this patent subsequent to May 8, 2001 has been disclaimed.

[21] Appl. No.: 573,089

[22] Filed: Jan. 23, 1984

Related U.S. Application Data

[63] Continuation of Ser. No. 390,294, Jun. 21, 1982, Pat. No. 4,444,573.

[51] Int. Cl.³ ............................................. B01D 47/00
[52] U.S. Cl. .............................................. 55/85; 55/89
[58] Field of Search ................ 55/85, 89; 98/115 SB; 252/DIG. 14, 312

[56] References Cited

U.S. PATENT DOCUMENTS

| Re. 27,456 | 8/1972 | Davis et al. | |
|---|---|---|---|
| 3,213,030 | 10/1965 | Diehl | 252/106 |
| 3,579,453 | 5/1971 | Dupre et al. | 252/356 |
| 3,633,339 | 1/1972 | Wiewiorski et al. | |
| 4,261,707 | 4/1981 | Bradshaw et al. | 55/85 |
| 4,339,248 | 7/1982 | Garner | |
| 4,353,715 | 10/1982 | Mir et al. | 55/85 |
| 4,378,235 | 3/1983 | Cosper et al. | 55/85 |
| 4,444,573 | 4/1984 | Cosper et al. | 55/54 |

OTHER PUBLICATIONS

International Publication WO82/01324, 4/29/82, Weitman, pp. 1-7, dwg. 1 sheet.

Primary Examiner—Bernard Nozick
Attorney, Agent, or Firm—John G. Premo; Robert A. Miller

[57] ABSTRACT

A method for using an aqueous hydrotrope solution to remove at least a portion of a solvent from a stream of air containing the solvent, wherein the method comprises introducing the stream of air containing the solvent into a scrubber containing an effective amount of the aqueous hydrotrope solution, and contacting of the stream of air containing the solvent with the aqueous hydrotrope solution thereby producing a first scrubber product stream containing scrubbed air and a second scrubber product stream containing the aqueous hydrotrope solution and the solvent.

3 Claims, 1 Drawing Figure

HYDROTROPES AND USES THEREOF

This application is a continuation of copending application Ser. No. 390,294, filed on June 21, 1982 now U.S. Pat. No. 4,444,573.

BACKGROUND OF THE INVENTION

The present invention relates to a hydrotrope and to a method for using an aqueous hydrotrope solution to remove at least a portion of a solvent from a stream of air containing the solvent. More particularly, the present invention relates to a variety of hydrotropes and to methods of using aqueous solutions of hydrotropes to reduce solvent-vapor emissions at paint spray booths.

Large quantities of coatings such as paint, lacquers and varnishes are used in the automobile, appliance, and other industries to coat finished products. A vast majority of these coatings are solvent based. Many times such coatings are applied to workpieces in enclosed areas called paint spray booths.

In paint spray booths, substantial quantities of air (in the form of air streams) are used to clean the booths of paint or lacquer particles, volatile organic paint carriers, solvents, and the like. Such air streams pick up substantial quantities of paint particles, volatile solvents or carrier vapors which are then disposed of. In the past, this disposal has consisted of discharging the vapors or particles to the atmosphere. Such a discharge of volatile organic solvent vapors presents an environmental pollution problem, as well as a serious economic problem, because the lost materials must be replaced.

Although the air streams in paint spray booths have been conventionally washed with water, water acts as a poor solvent for the volatile organic material and performs inadequately in containing these materials. As particulate material (in the form of over-sprayed paint solids) becomes trapped by the water, the paint solids tend to hold their associated solvent or carrier. This additionally results in organic solvent vapors being discharged to the atmosphere.

Current economics dictate that modification of existing paint spray booth systems to eliminate discharge of volatilized solvents into the atmosphere is expensive, often prohibitively so, using state-of-the-art techniques such as carbon adsorption, incineration and the like. Accordingly, it has been discovered that by adding certain hydrotropic substances to the wash water of paint spray booth systems, substantial quantities of solvents can be recovered.

The term "hydrotrope" here refers to a substance which has the property of increasing the aqueous solubility of a variety of otherwise only slightly water-soluble organic chemicals. But more specifically, the hydrotrope of the present invention is a chemical substance which includes an organic group chemically bonded to a polar group. The organic group can be an aromatic, an aliphatic, or combinations thereof. When the organic group is an aliphatic, the carbon chain length can range from about $C_3$ to about $C_{10}$. When the aliphatic group has a chain length beyond $C_{10}$, the chemical substance acts as a surfactant. When such chemical substance is added to water, foaming is experienced. In the operations of paint spray booths, such foaming is undesirable.

When the organic group is an aromatic or a combination of aromatic and aliphatic, the chain length can range from about $C_6$ (as when benzene is the aromatic) to about $C_9$. Such chain length designation includes the aromatic group and the additional hydrocarbon group or groups chemically bonded thereto. Here again, the chemical substance acts as a surfactant beyond the $C_9$ chain length range.

The polar group of the hydrotrope can be a carboxylate, a phosphate, a phosphonate, a sulfate or a sulfonate, all of which are in the form of a salt. The above-described polar groups are salts of sodium (Na), ammonium, cesium, potassium or any such salt which is highly water-soluble. The sodium, ammonium, cesium and potassium, of course, are the cationic portions of these salts. Such a salt, when chemically bonded to any one of the above-described organic groups, presents the chemical substance with surprising qualities. One quality is that the chemical substance, when added to water, greatly increases the water solubility of certain organic compounds, such as hydrocarbon-based solvents. Another quality is that the chemical substance itself is highly soluble in water. The chemical substances of the present invention perform as hydrotropic substances.

The hydrotropes of the present invention have a minimum carbon chain length restriction because if the organic group does not have an adequate number of carbon atoms, the chemical substance will not be effective in increasing the water solubility of organic solvents which are not normally water soluble. The key here is that the chemical substance have enough of an "organic character". Having such, the chemical substance can then cause such an organic solvent to become dissolved in water. Thus, a minimum carbon chain length restriction, as to the organic group, provides the chemical substance with this desired quality.

Particularly useful hydrotropes are sodium hexanoate, sodium octanoate, sodium xylenesulfonate, and sodium cumenesulfonate. Sodium hexanoate is a sodium salt of hexanoic acid. Sodium octanoate is a sodium salt of octanoic acid.

The sodium xylenesulfonate described here for purposes of teaching the present invention is available commercially from Witco Chemical Corporation of New York, N.Y. The sodium cumenesulfonate described here for purposes of teaching the present invention is a commercially available sulfonated cumene. As such, it is normally sulfonated in the para position, but may include some cumene sulfoanted in the meta or ortho position. The sodium cumenesulfonate described here contains cumene which was sulfonated primarily in the para position.

OBJECTS AND SUMMARY OF THE INVENTION

A general object is to provide such a hydrotropic substance which significantly increases the aqueous solubility of certain paint solvents, not normally water soluble. Such paint solvents can include butyl acetate, xylene, toluene, methyl amyl ketone, ethyl acetate, amyl acetate, or the like.

A further object is to provide a method for removing at least a portion of a solvent from a stream of air containing the solvent, such as the air in paint spray booth systems, using an economical absorbing fluid for the removal of the solvent.

Yet another object is to provide a method for recovery of the solvent and a method for recovery and re-use of the hydrotropic substance, so as to overcome the pollution and economic problems described above.

Briefly and in accordance with the foregoing objects, a hydrotropic substance comprising an organic portion and a polar portion is disclosed for use in removing at least a portion of a solvent from a stream of air containing the solvent comprises introducing the stream of air into a scrubbing device containing an effective amount of the aqueous hydrotrope solution. The scrubbing device maintains a sufficient degree of contacting between the stream of air and the aqueous hydrotrope solution to produce a first scrubber product stream containing the aqueous hydrotrope solution and the solvent.

BRIEF DESCRIPTION OF THE DRAWINGS

The foregoing as well as other objects, features and advantages of the invention will become more readily understood upon reading the following detailed description of the illustrated embodiment, together with reference to the attached drawing. The attached drawing (FIG. 1) shows a schematic view of a process for continuously recovering volatile organic substances such as solvents and for continuously recovering and thereafter re-using hydrotropic substances.

DETAILED DESCRIPTION OF THE ILLUSTRATED EMBODIMENT

Figure 1:
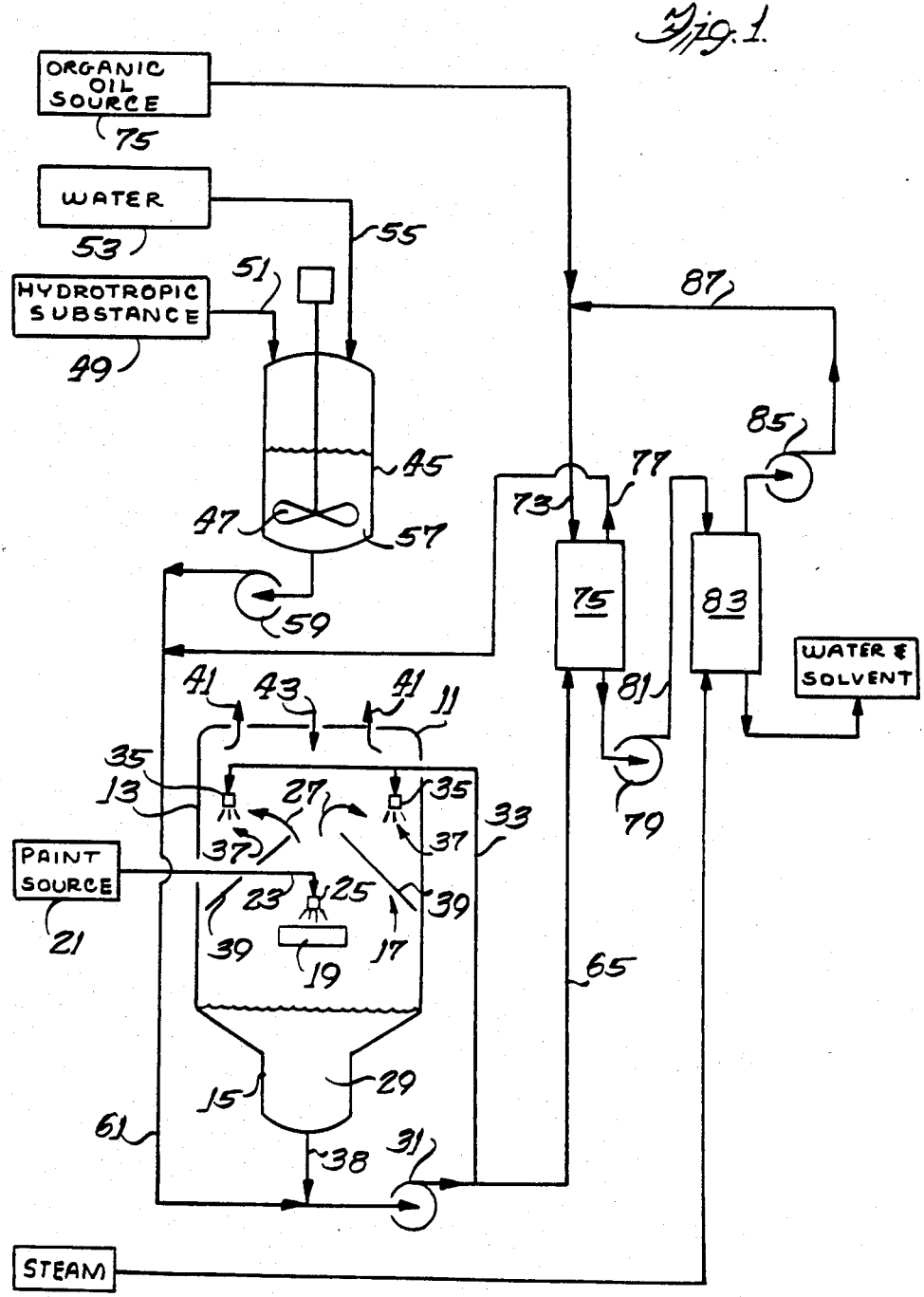

Referring now to FIG. 1, a paint spray booth 11 is illustrated. Such a paint spray booth 11 may be of the type equipped to wash paint solids or volatile organic paint carriers or solvents substantially as described above, but is not limited thereto. The illustrated paint spray booth 11 comprises a scrubber shell 13, a scrubber liquor sump 15 and an area (referred to generally by the reference numeral 17) where a workpiece 19 is painted. For purposes of further illustrating this paint spray booth 11, a solvent-containing paint from a paint source 21 is conveyed through a conduit 23 to a spray nozzle 25 and onto the workpiece 19.

As the workpiece 19 is being sprayed with paint, air currents 27, which have picked up paint particles and paint solvents, move away from the workpiece 19. Such air currents 27 must be scrubbed of the paint particles and solvents; and FIG. 1 illustrates one such scrubbing method. In the illustrated scrubbing method, a quantity of scrubber liquor 29 is conveyed, such as by a pump 31, through a conduit 33 and thereafter through a plurality of spray nozzles 35 to a plurality of desired regions (referred to generally by the reference numeral 37) where effective gas-liquid contact between the air currents 27 and the scrubber liquor 29 can be made. (The illustrated scrubber liquor sump 15 includes an outlet 38.) To effect a desired flow of the air currents 27, a plurality of baffle means 39 can be included.

After scrubbing paint particles and paint solvent from the air currents 27, the scrubber liquor 29 returns to the scrubber liquor sump 15.

As illustrated in FIG. 1, the paint spray booth 11 is a partially open system which permits a volume of scrubbed air 41 to move away from the vicinity of the paint spray booth 11. Accordingly, fresh air 43 is permitted to move into the vicinity of the paint spray booth 11.

A tank 45, which includes agitation means 47, is shown in FIG. 1 for supplying a hydrotropic substance to the paint spray booth 11 for purposes of practicing the invention. The hydrotropic substance source 49 supplies a hydrotropic substance through a conduit 51 into the tank 45. A sufficient amount of water from a water source 53 is conveyed by a conduit 55 to the tank 45 to make a desired concentration of a suitable aqueous hydrotropic solution 57. Thereafter, the aqueous hydrotrope solution 57 is conveyed, by a pump 59 or other means, through a conduit 61 and thereafter into the paint spray booth 11 where it mixes with the scrubber liquor 29. For purposes of illustrating use of the hydrotropic substance of the present invention, the conduit 61 is shown as combining with the scrubber liquor sump outlet 38. The aqueous hydrotrope solution 57 and the scrubber liquor 29 thus mix and are thereafter conveyed by the pump 31 into the paint spray booth 11.

A method for using the aqueous hydrotrope solution 57 to remove at least a portion of a solvent from a stream of air 27 containing the solvent, comprises introducing the stream of air 27 into a scrubbing device, here represented as that scrubbing region within the paint spray booth 11 where the air currents 27 are directed. Such a scrubbing region is proximate to the spray nozzles 35 and is ideally the desired regions 37.

The scrubber liquor 29 contains an effective amount of the aqueous hydrotrope solution 57 for effectively scrubbing the paint particles and solvents out of the air currents 27. When the paint spray booth 11 is operated in a continuous manner, substantially as outlined above, the solvent concentration of the scrubber liquor 29 continuously increases. It eventually becomes necessary to bleed solvent-rich scrubber liquor 29 from the paint spray booth 11 scrubbing system. Air-liquid contact produces a quantity of first scrubber product. This first scrubber product is conveyed within a conduit 65 by the pump 31, and away from the paint spray booth 11. The first scrubber product includes some aqueous hydrotrope solution 57 and some solvent. In practicing this invention, it is contemplated that this continuous stream of first scrubber product can be accumulated in a storage vessel (not shown) for future use. Such future use can include recovery of the solvent and recovery and re-use of the hydrotropic substance. Continuously conveying a stream of first scrubber product away from the bulk of the scrubber liquor 29 (via the conduit 65) thus provides a way for withdrawing or bleeding solvent away from the scrubber liquor sump 15.

Gas-liquid contact between the air currents 27 and the scrubber liquor 29 at the desired region 37 additionally provides a quantity of second scrubber product which here consists of the scrubbed air 41.

The above describes a manner of operating a paint spray booth. Such a manner of operation can be batch, continuous or semi-continuous. However, operation of a paint spray booth 11 is usually of a continuous or semi-continuous nature. Accordingly, a method for continuously recovering at least a portion of a solvent from a stream of air containing the solvent includes more process equipment. Added process equipment such as an extraction device and a stripping device provides means for recovery of the solvent and means for recovery and re-use of the hydrotropic substance, respectively. One such method for recovering the solvent and recovering, and thereafter reusing the hydrotropic material comprises a three step process.

In the first step air currents 27 (which contain the paint particles and the paint solvent) are introduced into the scrubbing region 37 while scrubber liquor 29 containing an effective amount of the hydrotropic substance is simultaneously added thereto. Also, a sufficient degree of air-liquid contact between the air currents 27 and the scrubber liquor 29 is simultaneously maintained. The plurality of nozzles 25 provides a suitable degree of air-liquid contact. Thus, the effect of the first step is to produce a first scrubber product stream containing the aqueous hydrotropic substance and the solvent and a second scrubber product stream containing the scrubbed air 41, both of these scrubber product streams being produced on a continuous basis.

In the second step the first scrubber product stream is introduced into a continuous extraction device adapted to permit extraction of the solvent from the solvent-rich scrubber liquor. One such continuous extraction device is a liquid-liquid extraction device which operates by continuously introducing the first scrubber product stream while simultaneously adding an effective amount of a liquid which extracts the solvent from the solvent-rich scrubber liquor 29. Liquids useful as extractants, in practicing the present invention, are represented by numbers 1, 2, and 3 in Table I below. These liquid extractants are classified as organic oils.

TABLE I

| Organic Oil Number | 1[a] | 2[b] | 3[c] |
| --- | --- | --- | --- |
| Classified as | a mixture of aliphatic and aromatic substances | an aliphatic substance | an aliphatic substance |
| Density | 0.907 g/cm$^3$ @ 15° C., max | 0.846 g/cm$^3$ @ 25° C. | 0.829 to 0.839 g/cm$^3$ @ @ 25° C. |
| Flash Point | 160° C. min. | 360° F. | 177° C. |
| Pour Point | −18° C. max. | +15° F. | −7° C. max. |
| Viscosity | 105 to 115 SUS[d] at 100° F. | 89 SUS[d] at 100° F. | 62 to 68 SUS[d] at 100° F. |

[a]One such commercially available organic oil, having physical properties similar to those of organic oil number 1, is currently being sold by the Humble Oil & Refining Company of Houston, Texas, under the "Telura" trademark and is specifically referred to as Telura 323 Process Oil or R-2336.
[b]One such commercially available organic oil, having physical properties similar to those of organic oil number 2, is currently being sold by the Humble Oil & Refining Company of Houston, Texas, under the "Bayol" trademark and is specifically referred to as Bayol 92 White Oil.
[c]One such commercially available organic oil, having Physical properties similar to those of organic oil number 3, is currently being sold by the Witco Chemical Company, Incorporated of New York, New York, under the "Carnation" trademark and is specifically referred to as Carnation NF White Oil.
[d]"SUS" is an abbreviation for Saybolt Universal Seconds.

An appropriate organic oil is conveyed by a conduit 73 from an organic oil source 75 and into an appropriate extraction device. The appropriate extraction device can be any one of a variety of commercially available extraction devices. The preferred extraction device, shown in FIG. 1 is a liquid-liquid extractor 75. Thus, in practicing the invention as illustrated in FIG. 1, it is contemplated that the preferred extraction device receives a continuous stream of first scrubber product, via the conduit 65, and simultaneously receives a continuous stream of an appropriate organic oil, via the conduit 73. The extraction device, when operating in a normal manner, thus produces continuously a first extractor product stream containing a recovered form of the aqueous hydrotrope solution and a second extractor product stream containing the organic oil and the solvent. The first extractor product stream is shown in FIG. 1 as being conveyed away from the liquid-liquid extractor 75 within a conduit 77 and thereafter being combined with the aqueous hydrotrope solution 57 for eventual re-use in the paint spray booth 11. When the liquid-liquid extractor 75 is operating in a normal manner, it produces a first extractor product stream which had had the solvent substantially removed. The second extractor product stream is shown in FIG. 1 as being conveyed, such as by a pump 79 or other means, away from the liquid-liquid extractor 75 and through a conduit 81 into an appropriate stripping device adapted to strip the organic oil from the solvent, thus permitting re-use of the recovered organic oil in the process. Any one of a variety of commercially available stripping devices can be so employed, and a preferred stripping device is a stream stripper 83.

A third step contemplates continuously introducing the second extractor product stream into the steam stripper 83 while simultaneously adding a sufficient amount of steam (at a predetermined temperature and pressure) for producing a first stripper product stream and a second stripper product stream. In FIG. 1, the first stripper product stream is shown as being conveyed, as by a pump 85 or other means, through a conduit 87 and thereafter being combined with organic oil entering the liquid-liquid extractor 75. The first stripper product stream contains a recovered form of the organic oil. When it is operated in a normal fashion, the steam stripper 83 thus continuously produces a first stripper product stream which has had the solvent substantially removed therefrom. The normal operation of the steam stripper 83, accordingly, continuously produces a second stripper product stream which comprises water and the solvent. It is contemplated that the above-described process can include the step of continuously recovering at least a portion of the solvent from the second stripper product stream.

This method for recovering the solvent and recovering and re-using the hydrotropic substance can include condensing the steam present in the second stripper product stream in a commercially available condensing device, thereby producing a condenser product stream containing water and the solvent.

The organic oil (useful as an extractant) is generally a process oil derived from petroleum. It generally contains a mixture of aromatic and aliphatic substances, has a viscosity at about 100 degrees Fahrenheit of between about 50 and about 125 Saybolt Universal Seconds, and has a boiling point in excess of 200 degrees Centrigrade. The appropriate organic oil can be in an emulsified state.

EVALUATION OF THE INVENTION

Initial evaluation of hydrotropes for the purpose of removing hydrocarbon vapors from air was carried out under static test conditions. In this test, toluene was vaporized into an air stream which was then passed through the solution being evaluated by means of a gas washing bottle. The concentration of toluene in the air after scrubbing was measured over a period of 30 minutes and compared to a control test in which water was used as the scrubbing medium. From the data presented in Table II, it is observed that the hydrotrope solutions will retain the solvent longer than will water.

In Table III comparison of varying concentrations of sodium xylene sulfonate in the solution is studied. It is noted that at the higher concentrations, the reduction of emissions is greatest, particularly during the early time periods of testing.

The solubility of toluene in various aqueous hydrotrope solutions was evaluated. The data, presented in Table IV shows that the highest toluene solubility is exhibited by a 33.3% solution of sodium octanoate. This solution was selected for further testing.

The ability of an aqueous sodium octanoate solution to absorb volatile organics from a paint spray booth exhaust was evaluated in a miniaturized spray booth.

The hydrotrope solution used as the scrubbing medium was prepared according to Table V. From the test parameters and the data outlined in Table VI, it is seen that use of this solution will reduce the amount of volatiles emitted to the atmosphere by approximately 70%. This is a seven fold increase compared to a test run using only water.

Samples of the hydrotrope solution taken at intervals throughout the test in the miniaturized spray booth were evaluated for volatile content. The results shown in Table VII, indicate that the hydrotrope solution continued to absorb solvent and did not, by the end of the test run, reach the limit of its absorption capacity.

It is also of importance to note that the paint after coming in contact with the hydrotrope solution, becomes dispersed. The dispersed solids were easily removed via filtration. To remove the solvent absorbed from the hydrotrope solution, liquid/liquid extraction techniques using three types of oil were evaluated. Analysis of the aqueous phases resulting from the extraction methods show that 95% of the volatiles absorbed may be removed. Data is presented in Table VIII. Once extracted into the oil phase, the solvent may be recovered by steam stripping or distillation.

TABLE II
STATIC TEST RESULTS
TOTAL MG TOLUENE DETECTED

| TIME (MINUTES) | CONTROL | Na XYLENE SULFONATE | Na TOLUENE SULFONATE |
|---|---|---|---|
| 10 | 36.0 | 11.3 | 18.3 |
| 20 | 63.5 | 28.9 | 45.4 |
| 30 | 70.9 | 42.3 | 61.5 |
| 60 | 76.7 | 64.3 | 78.5 |

TABLE III
PERCENT REDUCTION OF TOLUENE EMISSIONS AT VARYING SODIUM XYLENE SULFONATE CONCENTRATIONS

| TIME (MINUTES) | % SODIUM XYLENE SULFONATE | | | |
|---|---|---|---|---|
| | 30 | 40 | 50 | 60 |
| 10 | 26.0 | 53.8 | 63.8 | 70.3 |
| 20 | 5.8 | 10.6 | 39.4 | 53.5 |
| 30 | 0 | 2.2 | 21.7 | 40.8 |
| 60 | 0 | 0 | 1.4 | 18.2 |

TABLE IV
SOLUBILITIES OF LIQUID TOLUENE IN VARIOUS AQUEOUS SOLUTIONS

| ADDED INGREDIENT | % Conc. (w/w) in $H_2O^e$ | SOLUBILITY OF TOLUENE (ppm)[f] |
|---|---|---|
| None | — | ≦500 |
| Urea | 33.3 | 890 |
| Dimethylurea | 22.7 | 1600 |
| Na salicylate | 33.3 | 1700 |
| Na xylenesulfonate | 33.3 | 6200 |
| Na cumenesulfonate | 33.3 | 28000 |
| Na acetate | 33.3 | 77 |
| Na propionate | 33.3 | 200 |
| Na hexanoate (caproate) | 33.3 | 10400 |
| Na octanoate (caprylate) | 33.3 | 38000 |
| di-Na glutarate | 33.3 | 61 |

[e]This concentration, in water, is based upon the weight of the added ingredient with reference to the total weight of solution.
[f]The term "parts per million" is abbreviated to "ppm".

TABLE V
HYDROTROPE SOLUTION FORMULATION

| COMPONENT | WEIGHT % |
|---|---|
| Reagent grade sodium hydroxide (50% aq.) | 16.05 |
| Deionized water | 55.00 |
| Octanoic acid[1] | 28.95 |

[1]The octanoic acid was added slowly to the mixture of sodium hydroxide and water to allow for the dissipation of heat.

TABLE VI
PILOT SPRAY BOOTH TEST RESULTS

| HYDROTROPE EVALUATION | |
|---|---|
| Spray rate | 1.0 grams/minute |
| volatiles (weight) | 65% |
| Air velocity | 200 ft/minute |
| Stack diameter | 4 inches |
| Volume air flow | 17.5 CFM |
| Theoretical emission level | 731 ppm |
| Average emission level | 218 ppm |
| Reduction of emissions | 70.2% |
| CONTROL TEST RUN | |
| Average emission level | 650 ppm |
| Reduction of emissions | 9.7% |

TABLE VIII
VOC LEVELS IN SCRUBBING LIQUOR

| SAMPLE TIME (MINUTES) | VOC DETECTED (ppm) |
|---|---|
| 0 | assumed 0 |
| 37 | 71 |
| 71 | 16 |
| 119 | 42 |
| 152 | 811 |
| 171 | 673 |

TABLE VIII
LIQUID/LIQUID EXTRACTION OF HYDROTROPE SOLUTION[1]

| SAMPLE | EXTRACTION LIQUID | SOLVENT DETECTED IN AQUEOUS PHASE | | | |
|---|---|---|---|---|---|
| | | ppm MEK | ppm TOLUENE | ppm OTHER | TOTAL |
| 1 | None | 28 | <1 | 140 | 168 |
| 2 | Carnation white oil (Witco) | <1 | <1 | 40,000[2] | 40,000 |
| 3 | Bayol 92 white oil (Exxon) | <1 | <1 | 40 | 40 |
| | 100 second viscosity process oil | <1 | <1 | 7 | 7 |

[1]The hydrotrope solution was a 29% (w/w) aqueous solution of sodium octanoate.
[2]It is probable that a low molecular weight component is present in the Carnation White oil which is extracted into the hydrotrope solution.

What has been illustrated and described here is a hydrotropic substance and a method for using it. While the hydrotropic substance and method for use have been illustrated and described with reference to a preferred embodiment, the invention is not limited to those embodiments. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

We claim:

1. A method for using an aqueous organic hydrotrope solution to remove at least a portion of a hydrocarbon solvent from a stream of air containing the solvent, wherein the method comprises introducing the stream of air containing the solvent into a scrubber containing an effective amount of the aqueous organic hydrotrope solution, and contacting of the stream of air containing the hydrocarbon solvent with the aqueous organic hydrotrope solution thereby producing a first scrubber product stream containing scrubbed air and a second scrubber product stream containing the aqueous organic hydrotrope and hydrocarbon solvent solution.

2. A method for removing at least a portion of a hydrocarbon solvent from a stream of air containing the solvent, the method comprising intimately contacting the stream of air containing the hydrocarbon solvent with an aqueous organic hydrotrope solution thereby producing a scrubbed air and an aqueous organic hydrotrope and hydrocarbon solvent solution.

3. The method of claim 2 wherein the aqueous organic hydrotrope solution is selected from aqueous solution of a hydrotrope from the group consisting of sodium octanoate, sodium hexanoate, sodium cumenesulfonate and sodium xylenesulfonate.

* * * * *